United States Patent
Lefort

[15] 3,666,783
[45] May 30, 1972

[54] PROCESS FOR THE PREPARATION OF UNSATURATED ORGANOSILICON COMPOUNDS

[72] Inventor: Marcel Lefort, Caluire, France
[73] Assignee: Rhone-Poulenc S.A., Paris, France
[22] Filed: Sept. 9, 1970
[21] Appl. No.: 70,910

[30] Foreign Application Priority Data

Sept. 10, 1969 France..................................6930795

[52] U.S. Cl..................................260/448.2 E, 260/448.2 Q
[51] Int. Cl.....................................................C07f 7/08
[58] Field of Search....................260/448.2 E, 448.2 Q

[56] References Cited

UNITED STATES PATENTS 2,403,370 7/1946 Hurd..............................260/448.2 E

OTHER PUBLICATIONS

DuPont et al., " Bull. Soc. Chim. France," p. 342, 1959.

Thiele et al., " Z. Anorg. Allg. Chem.," 337, p. 65, 1965.
Noll, " Chemie und Technologie Der Silicone," Verlag Chemie, Weinheim/Bergstr., 1960, p. 39.

*Primary Examiner*—Tobias E. Levow
*Assistant Examiner*—P. F. Shaver
*Attorney*—Stevens, Davis, Miller & Mosher

[57] ABSTRACT

Organosilicon compounds having at least one

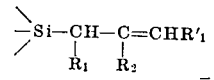

where $R_1$ is H or alkyl and $R_2$ and $R'_1$ are H or alkyl or together with the carbon atoms to which they are bonded form an aliphatic or aromatic ring of five or six ring carbon atoms are prepared by reacting

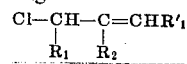

with zinc and a compound containing at least one Si-Cl bond in the presence of a hexa-alkylphosphotriamide or an N-alkylpyrrolidone.

10 Claims, No Drawings

PROCESS FOR THE PREPARATION OF UNSATURATED ORGANOSILICON COMPOUNDS

The present invention relates to a process for the preparation of organosilicon compounds containing at least one monovalent hydrocarbon group, directly linked to a silicon atom, the group possessing a carbon-carbon double bond in the β-position to the silicon atom.

Processes are already known which introduce benzyl groups or allyl groups into organosilicon compounds. These processes are generally carried out via organo-magnesium compounds, starting from allyl bromides [(Journal of General Chemistry USSR 30 940 (1960)]or starting from benzyl chloride [J. Am. Chem. Soc. 74 1856 (1952)]. However, it is necessary to observe very strict working conditions so as to avoid dimerization as a result of WURTZ reactions [Annales Chimie 136 1071–3 (1961) ].

The present invention provides a process for the preparation of an organosilicon compound haVing at least one group of the formula

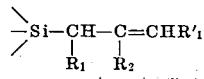

where $R_1$ represents hydrogen or a straight or branched chain alkyl group, and $R_2$ and $R'$ each represent hydrogen or a straight or branched chain alkyl group, $R_1$ and $R'_1$ then being identical, or $R_2$ and $R'_1$ together represent a saturated or unsaturated divalent radical which, with the carbon atoms to which $R_2$ and $R'_1$ are attached, forms a cycloaliphatic or aromatic ring of five or six carbon atoms; which comprises reacting a compound of formula $$Cl-CH-C=CHR'_1$$
$$\quad\ \ |\quad\ \ |$$
$$\quad\ \ R_1\ \ R_2 \qquad\qquad I$$

zinc and an organosilicon compound containing at least one SiCl bond in a hexaalkylphosphotriamide or an N-alkylpyrrolidone.

The reaction can be schematically represent as follows:

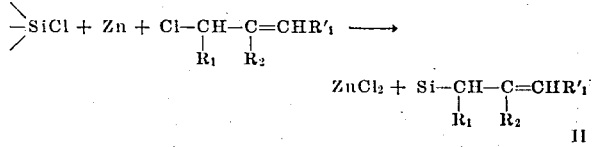

II

Compounds of formula I which may be used in the process include allyl derivatives such as allyl chloride, methallyl chloride and 2-chloro-pentene-3, and benzyl derivatives such as benzyl chloride and 1-chloromethyl-cyclohexene.

In these compounds I, when $R_1$, $R_2$ and $R'_1$ represent an alkyl group, it is preferred that the alkyl group contains one to four carbon atoms.

The process according to the invention yields a single organosilicon compound. This process is equally applicable to the compounds I in which $R_1$ and $R'_1$ are different monovalent radicals; in view of the possibility of an allyl rearrangement of the compound I, a mixture of two isomeric compounds is then obtained.

The process is carried out in a hexaalkylphosphotriamine or an N-alkylpyrrolidone having the following formulae:

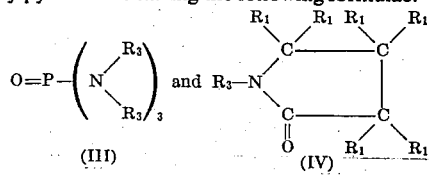

where $R_1$ is as defined above and wherein the $R_3$ groups, which may be identical or different, each represent a straight or branched chain alkyl group of one to four carbon atoms. It is preferred to use hexamethyl-phosphotriamine or N-methylpyrrolidone.

The organosilicon compounds possessing an SiCl bond which can be used as starting material in the process of the invention can be of very diverse nature. They can, for example, be organochlorosilanes of formula:

$$(R_4)_{4-n}SiCl_n \qquad\qquad V$$

wherein $n$ is an integer of 1 –4 and $R_4$ represents an aliphatic or cycloaliphatic monovalent organic group, which may be saturated or contain one or more sites of ethylenic unsaturation, or an aryl or aralkyl group, or an alkoxy or cycloalkoxy group. The radicals $R_4$ can furthermore contain various substituents which are inert i.e. non reactive under the working conditions of the process, for example, a cyano group. More particularly, $R_4$ may represent a straight or branched chain alkyl group of one to six carbon atoms, a straight or branched chain alkenyl group of two to six carbon atoms, a cycloalkyl or cycloalkenyl group of five or six carbon atoms in the ring, a phenyl, alkylphenyl or phenylalkyl group, an alkoxy group of one to six carbon atoms, a cyclopentyloxy or cyclohexyloxy group or a phenoxy group which may be unsubstituted or substituted by normal or branched chain alkyl groups, such groups containing one to six carbon atoms. Compounds of formula V which can be used include: trimethylchlorosilane, tripropylchlorosilane, dimethylvinylchlorosilane, dimethylphenylchlorosilane, methyldiphenylchlorosilane, triphenylchlorosilane, diphenyldichlorosilane, methylvinyldichlorosilane, methyltrichlorosilane, penyltrichlorosilane, dimethylbutoxychlorosilane and dimethylcyclohexyloxychlorosilane.

The organosilicon compound I may also be an organochloropoly-silane. These may be compounds such as those of general formula:

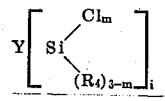

VI wherein Y represents a simple valency bond between two silyl groups, a divalent atom such as oxygen, or a radical of valency $i$ equal to or greater than 2, consisting of purely hydrocarbon chains, or of polysiloxane chains, $m$ is ., 1, 2 or 3, the radicals $R_4$, which may be identical or different, are defined as above, and the value of $m$, which is other than zero in at least one silyl group, can differ from one silyl group to the other. Preferred compounds VI include compounds of general formula:

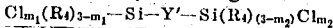

VII wherein $R_4$ is as defined above, $m_1$ and $m_2$ are integers which can be 1, 2 or 3, and one of $m_1$ and $m_2$ can furthermore be equal to O, and Y' is a simple bond or a divalent radical or atom. The symbol Y' can in particular represent a saturated or unsaturated divalent hydrocarbon radical which can be aliphatic, cycloaliphatic, aromatic or aralkyl, for example, a substituted or unsubstituted polymethylene radical of one to 10 carbon atoms, a cycloalkylene radical of five to six ring carbon atoms, or a substituted or unsubstituted or unsubstituted phenylene radical; or a divalent hydrocarbon radical furthermore containing one or more heteroatoms, for example an oxygen atom; or a divalent radical consisting of a divalent atom, for example an oxygen atom.

Such compounds of formula VII are, for example 1,2 - bis(dimethyl-chlorosilyl)-ethane, p-bis(dimethylchlorosilyl)benzene, 4,4'-p-bis(methyldichlorosilyl)-diphenyl-ether and 1,1,3,3 -tetramethyl-dichlorodisiloxane.

The process according to the invention is generally carried out so as to achieve complete substitution of the chlorine atoms bonded to a silicon atom. For this, it suffices for the amount of compound I to be at least equal to the stoichiometry of the reaction II. If an amount of compound I less than that required for complete substitution is used, partially substituted compounds are obtained.

The preparation of the organosilicon compounds containing units $-CHR_1-C(R_2) = CHR'_1$ is customarily carried out using amounts of reagents corresponding to the stoichiometry of reaction II, and an excess of any of the reagents does not produce an improvement.

The zinc is generally employed in the form of a powder; a powder of particle sizes close to or less than 0.2 mm is very suitable for this purpose. According to the invention, the precess is carried out in the presence of a hexaalkylphosphotriamide or N-alkylpyrrolidone, in practice using at least one mole of these compounds per gram atom of zinc and preferably 1.5 to 5 moles. The temperature at which the reaction is carried out is not critical; it is generally between 0° and 150° and preferably between 20°and 80° C.

In practice, the process is carried out as follows: the zinc powder and the hexaalkylphosphotriamine or N-alkylpyrrolidone are introduced into an apparatus, the reagents are heated to the desired temperature and a mixture consisting of the compound I and the chlorosilane is then slowly introduced. As the reaction mixture thickens at the end of the reaction, an additional amount of hexaalkylphosphotriamide or N-alkylpyrrolidone can be run in. Numerous variants can be introduced into the working method as regards the order of introduction of the reagents. The organosilicon product can be separated from the reaction mixture by any known process, for example by distillation under atmospheric pressure or under reduced pressure.

The organosilicon compounds obtained in accordance with this invention have very varied applications. In particular, the allyl derivaties, on polymerisation, yield macromolecules of an olefinic type, substituted by silicon-containing groups. These macromolecules possess improved heat stability and improved water resistance. Hydrogenosilanes can also be added to such compounds and a varied range or organosilicon compound can thus be obtained.

The Examples which follow illustrate the invention; Temperatures are in °C.

EXAMPLE 1

653 g of zinc and 3,800 g of hexamethylphosphotriamide are introduced into a 10 liter flask equipped with a dropping funnel and a packed column, and a mixture consisting of 1,085 g of chlorotrimethylsilane and 765 g of allyl chloride is run in over the course of 3 hours while keeping the temperature at 40°. When the addition is complete, the reagents are heated to 60° for 7 hours while continuing the stirring. Distillation under atmospheric pressure yields fractions of boiling point: 60–84.9, weighting 183.5 g, which contains 78 percent of allyltrimethysilane and the fraction of boiling point: 84.9–85.4, weight 809 g, containing over 99 percent of allyltrimethysilane.

EXAMPLE 2

65.3 g of zinc and 100 cm³ of hexamethylphosphotriamine are introduced into a flask, the reagents are heated to 40°, and 270 cm³ of hexamethylphosphotriamide and a solution containing 76.5 g of allyl chloride and one mole of one of the organosilicon compounds listed in Table 1 below are run in simultaneously at this temperature, over the course of 2 hours from two dropping funnels.

When the addition is complete, the reagents are heated to 60° for 5 hours and the allylsilane prepared is then distilled. Various fractions are thus recovered, in which the allylsilane content is determined by chromatography.

The results are given in Table No.1 below.

| Chlorosilane used | | Allylsilane obtained | | |
|---|---|---|---|---|
| Nature | Weight introduced g. | Nature | Weight | allylsilane content |
| dimethylvinyl-chlorosilane | 120.7 | allylvinyl-dimethylsilane | 108 g | 72% |
| dimethylphenyl-chlorosilane | 170.7 | allylphenyl-dimethylsilane | 160 g | 90% |
| methyldibutoxy-chlorosilane | 224.8 | allylmethyl-dibutoxysilane | 215 g | 92% |

EXAMPLE 3

The procedure of Example 2 is used, but replacing the hexamethylphosphotriamide by N-methylpyrrolidone. 65.3 g. of zinc and 100 cm³ of N-methylpyrrolidone are introduced into the reaction flask. The reagents are heated to 60° and 110 cm³ of N-methylpyrrolidone and a solution containing 76.5 g of allyl chloride and one mole of one of the monochlorinated organosilicon compounds listed in Table No. 2 below are simultaneously run in over the course of 2 hours, at this temperature, from two dropping funnels. When the addition is complete, the reagents are heated to 80° for 5 hours and the resulting allysilane is then distilled. Various fractions are thus recovered, in which the allysilane is determined by chromatography. The results are given in Table No. 2 below.

| Chlorosilane used | | Allylsilane obtained | | |
|---|---|---|---|---|
| Nature | Weight introduced g. | Nature | Weight | allylsilane content |
| trimethyl chlorosilane | 108.7 | allyltrimethylsilane | 102 g | 95% |
| dimethylvinyl-chlorosilane | 120.7 | allylvinyl-dimethylsilane | 112 g | 84% |
| dimethylphenyl-chlorosilane | 170.7 | allylphenyl-dimethylsilane | 165 g | 87.5% |

EXAMPLE 4

130.6 g of zinc and 200 cm³ of hexamethylphosphotriamide are introduced into the reaction flask. The reagents are heated to 40° and 540 cm³ of hexamethylphosphotriamide and a solution containing 153 g of allyl chloride and 129 g of dimethyldichlorosilane are run in simultaneously, over the course of two hours, by means of two dropping funnels. After stirring for 5 hours at 60° C and distilling, a fraction of boiling point$_{50}$ = 56°, weighing 108 g, containing 96.3 percent of diallyldimethylsilane is obtained.

EXAMPLE 5

The same charges and working methods as in Example 4 are used, but using 203 g of 1,3-dichloro-tetramethyldisiloxane. A fraction of boiling point$_{15}$ = 72°, weighting 177 g, containing 83.8 percent of 1,3-diallyl-tetramethyldisiloxane is obtained.

EXAMPLE 6

196 g of zinc and 300 m³ of hexamethylphosphotriamide are introduced into a reaction flask. The reagents are heated to 40° and 710 cm³ of hexamethylphosphotriamide and a solution containing 149.5 g of trichloromethylsilane and 229.5 g of allyl chloride are run in over the course of 2 hours from two dropping funnels. Following the procedure of the previous Examples, a fraction of boiling point$_{16}$ = 75°, weighting 135 g, containing 95 percent of triallylmethylsilane is obtained.

EXAMPLE 7

65.3 g of zinc and 100 cm³ of N-methlpyrrolidone are introduced into the reaction flask and 110 cm³ of N-methyl-pyrrolidone and a solution containing 765 g of allyl chloride and 129 g of dimethyldichlorosilane are simultaneously added over the course of 2 hours at 40°. The product is worked up as described in the previous Examples to give a fraction of boiling point$_5$ :107° weighing 69 g, containing 85.5 percent of allyldimethylchlorosilane.

EXAMPLE 8

280 cm³ of hexamethylphosphotriamide and a solution containing 126.5 g of benzyl chloride and 108.5 g of trimethylchlorosilane are run, over the course of 1 hour 30 minutes, at 40°, into a reaction flask containing 100 cm³ of hexamethylphosphotriamide and 65.3 g of zinc. After distillation, a fraction of boiling point $_{16}$ : 75°, weighing 135 g, containing 95 percent of trimethylbenzylsilane is obtained.

EXAMPLE 9

The procedure of the preceding Examples is repeated running 280 cm³ of hexamethylphosphotriamide and a mixture consisting of 76.5 g of allyl chloride and 42.5 g tetrachlorosilane into a reaction flask containing 65.3 g of zinc and 100 cm³ of hexamethylphosphotriamide over the course of 2 hours, at 40°. After distillation, a fraction of boiling point$_{15}$ : 98°, weighing 41 g, containing 92 percent of tetraallylsilane is obtained.

We claim:

1. A process for the preparation of an organosilicon compound having at least one group of the formula $$\diagdown_{\diagup}Si-\underset{R_1}{CH}-\underset{R_2}{C}=CHR'_1$$

wherein $R_1$ represents hydrogen or a straight or branched chain alkyl group, and $R_2$ and $R'_1$ each represent hydrogen or a straight or branched chain alkyl group, $R_1$ and $R'_1$ then being identical, or $R_2$ and $R'_1$ together represent a saturated or unsaturated divalent radical which, with the carbon atoms to which $R_2$ and $R'_1$ are attached, forms a cycloaliphatic or aromatic ring of five or six carbon atoms; which comprises reacting at 0°–150° C a compound of formula $$Cl-\underset{R_1}{CH}-\underset{R_2}{C}=CHR'_1 \qquad I$$

zinc and an organosilicon compound containing at least one SiCl bond in a hexaalkylphosphotriamide or an N-alkylpyrrolidone.

2. A process according to claim 1, wherein the organosilicon compound containing the Si—Cl bond has the formula $$(R_4)_{4-n}SiCl_n$$

or $$Y\left[\underset{(R_4)_{3-m}}{\overset{Cl_m}{\diagdown}}Si\diagup\right]_i$$

wherein $R_4$ represents (a) an aliphatic or cyclo-aliphatic monovalent organic group which is saturated or contains one or more sites of ethylenic unsaturation, or (b) an aryl, aralkyl or alkoxy or cyclo-alkoxy group, or one of said groups (a) or (b) which is substituted by substituents inert under the reaction conditions, $n$ is an integer of 1–4, Y represents a valency bond or a divalent atom or a hydrocarbon or polysiloxane chain of valency $i$ which is at least 2, and $m$ is 0, 1, 2 or 3, $m$ being other than zero in at least one silyl group and can differ from one silyl group to another.

3. A process according to claim 2, wherein the organosilicon compound containing the Si—Cl group has the formula $$Cl_{m_1}(R_4)_{3-m_1}-Si-Y'-Si(R_4)_{3-m_2}Cl_{m_2}$$

wherein $R_4$ is as defined in claim 2, $m_1$ and $m_2$ are each 1, 2 or 3 and one of $m_1$ and $m_2$ can also equal zero and Y' represents a valency bond or a divalent radical or atom.

4. A process according to claim 1, wherein the reaction is carried out using zinc powder of particle size close to or less than 0.2 mm.

5. A process according to claim 1, wherein the reaction is carried out in hexamethylphosphotriamide or N-methylpyrrolidone.

6. A process according to claim 1, wherein at least 1 mole of hexa-alkylphosphotriamide or N-alkyl-pyrrolidone is used per gram atom of zinc employed.

7. A process according to claim 1, wherein the compound of formula I is allyl chloride or benzyl chloride.

8. A process according to claim 7, wherein the compound containing at least one SiCl bond is chlorotrimethylsilane, dimethylvinylchlorosilane, dimethylphenylchlorosilane, methyldibutoxychlorosilane, dimethyldichlorosilane, 1,3-dichloro-tetramethyldisiloxane trichloromethylsilane or tetrachlorosilane.

9. A process for the preparation of an organosilicon compound having at least 1 group of the formula $$\diagdown_{\diagup}Si-\underset{R_1}{CH}-\underset{R_2}{C}=CHR'_1$$

which comprises reacting at 0°–150° C zinc, a compound of formula $$Cl-\underset{R_1}{CH}-\underset{R_2}{C}=CHR'_1 \qquad I$$

and an organosilicon compound of the formula $$(R_4)_{4-n}SiCl_n \qquad V$$

or $$Cl_{m_1}(R_4)_{3-m_1}-Si-Y'-Si(R_4)_{3-m_2}Cl_{m_2} \qquad VII$$

in the presence of a hexa-alkylphosphotriamide of formula $$O=P-\left(N\diagup^{R_3}_{\diagdown R_3}\right)_3 \qquad III$$

or an N-alkylpyrrolidone of formula $$\text{IV}$$

wherein $R_1$ represents hydrogen or a straight or branched chain alkyl group of one to four carbon atoms and $R_2$ and $R'_1$ independently represent hydrogen or a straight or branched chain alkyl group of one to four carbon atoms, $R_1$ and $R'_1$ then being identical, or $R_2$ and $R'_1$ together represent the saturated or unsaturated divalent radical which, with the carbon atoms to which $R_2$ and $R'_1$ are attached, forms a cycloaliphatic or aromatic ring of five or six carbon atoms;

$R_4$ represents a straight or branched chain alkyl group of one to six carbon atoms, a straight or branched chain alkenyl group of two to six carbon atoms, a cycloalkyl or cycloalkenyl group of five or six carbon atoms in the ring, a phenyl, alkylphenyl or phenylalkyl group, an alkoxy group of one to six carbon atoms, a cyclopentyloxy or cyclohexyloxy group or a phenoxy group which is unsubstituted or substituted by straight or branched chain alkyl groups containing one to six carbon atoms; $n$ is an integer of 1 to 4;

Y' represents a substituted or unsubstituted polymethylene group of one to 10 carbon atoms, a cycloalkylene group of five to six ring carbon atoms, a substituted or unsubstituted phenylene group, or a divalent hydrocarbon radical containing 1 or more hetero atoms or is an oxygen atom;

$m_1$ and $m_2$ are each 0, 1, 2 or 3, at least 1 of $m_1$ and $m_2$ being a positive integer;

and $R_3$ or the groups $R_3$ independently represent a straight or branched chain alkyl group of one to four carbon atoms.

10. A process according to claim 9 wherein the compound of formula I is allyl chloride or benzyl chloride, the compound of formula V is trimethylchlorosilane, tripropylchlorosilane, dimethylvinylchlorosilane, dimethylphenylchlorosilane, methyldiphenylchlorosilane, triphenylchlorosilane, diphenyldichlorosilane, methylvinyldichlorosilane, methyltrichlorosilane, phenyltrichlorosilane, dimethylbutoxychlorosilane or dimethylcyclohexyloxychlorosilane, the compound of formula VII is 1,2-bis(dimethylchlorosilyl)-ethane, p-bis(dimethylchlorosilyl)-benzene, 4,4′bis(methyldichlorosilyl)-diphenyl-ether or 1,1,3,3-tetramethyldichlorodisiloxane, the hexa-alkylphosphotriamide is hexamethylphosphotriamide and the N-alkylpyrrolidone is N-methylpyrrolidone.

* * * * *